July 4, 1950  H. B. SCHULTZ  2,513,681
REGULATOR VALVE
Filed Feb. 28, 1946
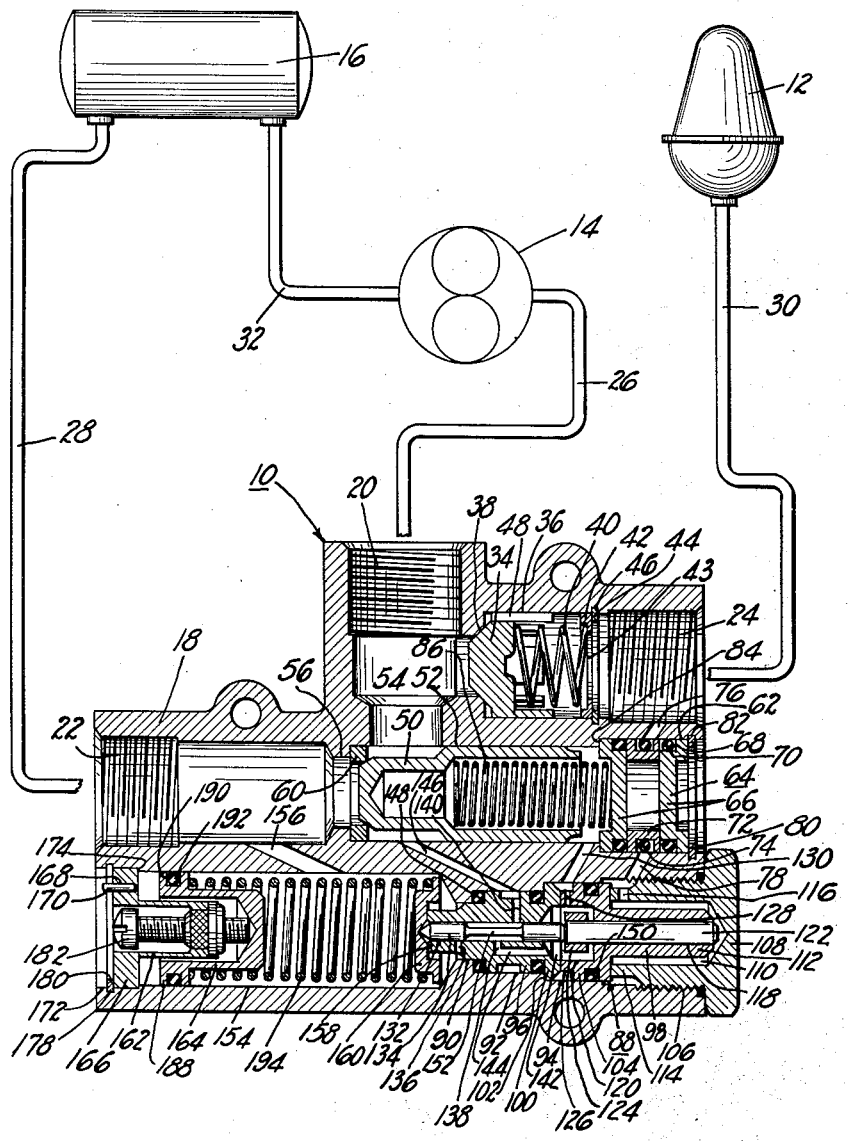
INVENTOR.
HAROLD B. SCHULTZ
BY
Cecil J Arens
ATTORNEY Patented July 4, 1950

2,513,681

UNITED STATES PATENT OFFICE 2,513,681

REGULATOR VALVE

Harold B. Schultz, South Bend, Ind., assignor to Bendix Aviation Corporation, South Bend, Ind., a corporation of Delaware Application February 28, 1946, Serial No. 650,972

6 Claims. (Cl. 137—153)

This invention relates generally to valves of a class to be used in fluid pressure systems, and more particularly to improvements on regulator valves of the type disclosed in my Patent No. 2,404,102, patented July 16, 1946 and Patent No. 2,393,571, patented January 22, 1946.

The valve of the invention differs from the aforementioned valves in many respects which will become obvious from reading the specification.

It is a primary object of the invention to provide a regulator valve which is operated by accumulator pressure without diminishing the pressure in the accumulator.

It is a further object of the invention to provide a regulator valve having a cycle of operation which is started by pressure in the inlet port and completed by accumulator pressure which rises to a predetermined high value and then falls to a predetermined low value.

An important object of the invention is to provide a regulator valve which can be readily converted from one range to another without removing the regulator valve from the system.

The above and other objects and features of the invention will be apparent from the following description of the device taken in connection with the accompanying drawing which forms a part of this specification, and in which the single figure illustrates a hydraulic system into which the regulator valve of the invention has been incorporated.

Referring to the drawing, the fluid pressure system shown comprises a regulator or unloading valve 10 which responds to the pressure in an accumulator 12 to control the by-passing of fluid from pump 14 to a reservoir 16.

The regulator valve 10 comprises a body 18 having an inlet port 20, outlet port 22 and accumulator port 24 connected respectively to the pump 14, reservoir 16 and accumulator 12 through conduits 26, 28 and 30. The pump 14 receives fluid from the reservoir 16 through pipe 32.

A check valve 34 is disposed in a bore 36 which communicates the inlet port 20 with the accumulator port 24. A valve seat 38 is formed in the bore 36 adjacent the inlet port. The check valve 34 is normally urged against the valve seat 38 by a spring 40 which has its free end engaging the check valve and its other end carried by a spring retainer member 42 having an opening 43 therethrough. The spring retainer member 42 is held against a ring-like element 44 which is securely retained in a recess 46 of the bore. The check valve 34 has a plurality of grooves such as 48 extending axially along the periphery thereof to permit the passage of fluid from the inlet port to the accumulator port when the check valve is off seat 38.

A plunger 50 is located in a bore 52 of the body 18. The bore 52 is coaxially related to the outlet port 22 with which the bore is joined. The inlet port 20 is bored at 54 to connect the bore 52 with the inlet port. The bore 52 is reduced at 56 where the bore and outlet port join to provide a stop which engages a valve seat 60 arranged to cooperate with one end of the plunger 50 to cut off communication between the inlet and outlet ports. The end of the bore 52, opposite from where the bore joins the outlet, is counterbored at 62 to receive a sealing assembly 64 which closes that end of the bore to atmosphere. The assembly 64 is comprised of two plugs 66 having removed portions 68 in their peripheries for receiving seals 70, and a ring-like element 72 having an annulus 74 which registers with passages 76 and 78. The assembly is held in the counterbore 62 by a retainer ring 80 which is retained in a recess 82 of the counterbore. The arrangement of the sealing assembly is such as to prevent any axial movement thereof in the counterbore. One end of the assembly is against shoulder 84 and the other end is engaged by the retainer ring 80. A relatively light spring 86 has one of its ends abutting the inner plug 66 and the other end abutting the plunger 50 to thereby urge the same against the valve seat 60 to normally cut off communication between the inlet and return ports.

At times plunger 50 is held against valve seat 60 by the spring 86 and the inlet or pump pressure acting in bore 52 on one end of plunger 50 opposite from the valve seat. When the plunger is on its seat the inlet or pump pressure also acts on the other end of the plunger tending to unseat same. The effective area of said other end of the plunger on which the inlet pressure acts tending to unseat the plunger being that area of the plunger created by the difference in diameters of the valve seat 60 and the bore 52. The effective area of the plunger exposed to inlet or pump pressure urging the plunger toward its seat is greater than the effective area of the plunger exposed to pump pressure urging the plunger away from its seat.

For controlling the movement of the plunger 50 a control valve 88 is provided. The valve body 18 is stepped bored at 90, 92 and 94 to receive the control valve 88 comprising valve guides 96 and 98. The guide 96 has an enlarged end 100 which engages a shoulder 102 formed between the bores 92 and 94 to position the guide axially in the stepped bore. The guide 98 has an enlarged end 104 abutting the enlarged end 100 of guide 96. The stepped bore 94 is threaded at 106 to accommodate a threaded plug 108 counterbored at 110 to receive small end 112 of the guide 98. The diameter of counterbore 110 is greater than the small end 112 of the guide 98 to allow the passage of fluid therebetween. Also the depth of the counterbore 110 is greater than the length of the small end 112 to allow fluid to act on one end thereof. The end of the plug 108 which screws into the stepped bore is reduced at 114 and engages the enlarged end 104 of the guide 98 to securely hold the guides 96 and 98 in place. The reduced end 114 of the plug is drilled radially at 116 to communicate the small end 112 of the valve guide with the accumulator port 24 through passages 116, 78, 74 and 76. The guide 98 is drilled axially at 118 and counterbored at 120 co-axially therewith to receive a push pin 122 which slidably fits into the drilled portion 118. The pin 122 has a ring 124 secured to one of its ends. The ring 124 is arranged on the pin 122 to slide into the counterbore 120 to limit the movement of the pin to the right. The push pin is lapped into the drilled portion 118. The enlarged end 104 of the guide 98 is reduced in diameter at 126 and drilled radially at 128. A drilled passage 130 connects the bore 52 in back of plunger 50 to the stepped bore 94 at the enlarged ends of guides 96 and 98. The guide 96 is drilled axially at 132 to receive a lapped fit piston valve 134, and is drilled radially at 136, 138 and 140. The enlarged end 100 of guide 96 is counterbored at 142 co-axially with the bore 132. The two counterbores 120 and 142 form a chamber into which one of the ends of push pin 122 and one of the ends of the piston valve 134 terminate in abutting relationship. A longitudinally drilled passage 144 connects the radial passage 138 to the chamber formed by the two counterbores aforementioned. Passage 146 connects the radial passage 140 to the bore 52 at a point in the bore on the opposite end from where the passage 130 connects the bore 52. The passages 130 and 146 form part of a conduit which connects opposite ends of plunger 50. The valve guides 96 and 98 are provided with seals 148 and 150 to prevent leakage to atmosphere. The piston valve 134 has a reduced portion 152 intermediate its ends which allows fluid to pass between the passages 136, 138 and 140. The reduced portion of the piston connects passage 138 to passage 140 when the piston valve is in the position shown and connects passage 136 to 138 when the piston valve is shifted to the left a predetermined distance. The construction and arrangement of the piston valve is such that when passage 136 is lapped or covered (as shown in the figure) passage 140 is uncovered to communicate the back side or one end of plunger 50 with the inlet port. Also when passage 140 is covered passage 136 is uncovered to communicate the back side or said one end of plunger 50 with a bore 154 co-axially arranged with respect to the stepped bore. A passage 156 connects the bore 154 to the outlet port 22. Valve guide 96 has a reduced end portion 158 projecting into the bore 154. Seal 148 prevents the passage of fluid under pressure from the stepped bore to bore 154. The end of the piston valve, opposite from the one end of the piston valve abutting the push pin, protrudes beyond the reduced portion 158 where it abuts a spring retainer member 160.

The pressure range of the accumulator may be varied by changing the relationship of the diameters of the push pin 122 and the piston valve 134. As shown in the drawing, the diameter of the push pin 122 is greater than the diameter of the piston valve 134. To increase the pressure range of the regulator valve increase the diameter of push pin 122 and to decrease the pressure range decrease the diameter of push pin 122.

To permit varying the high and low limit of the regulator valve an adjusting mechanism is provided. The adjusting mechanism is housed in the bore 154 and comprises two cup-like members 162 and 164, the former of which has a flange 166 drilled at 168 to receive fastening elements 170 for holding the member 162 securely in place. The bore 154 is slightly enlarged at 172 to form a shoulder 174 to engage the flange 166 to locate the member 162 axially in the bore. The enlarged part 172 of the bore is recessed at 178 to receive a retainer ring 180 for holding the member 162 against the shoulder 174. The bottom of the cup 162 is drilled and threaded to accommodate a screw 182, one end of which abuts the bottom of the cup 164. The two cup-like members being telescopically disposed relative to each other. Cup-like member 164 has a flange 188 with a groove 190 therein for receiving a seal 192 to prevent the escape of fluid past the flange 188 to atmosphere. A spring 194 has one end abutting the flange 188 and the other end abutting the spring retainer member 160 to thereby normally urge the piston valve to the right, covering passage 136 and uncovering passage 140.

Operation of the regulator valve is as follows:

With no pressure on the system the check valve 34, plunger 50 and control valve 88 will be in the position shown. That is, the check valve will be urged to closed position by the spring 40, the plunger 50 will be urged to cut off communication between the inlet and return ports by the spring 86 and the piston valve 134, of the control valve, will be urged to the right by the spring 194 to connect one end of the plunger 50 to the inlet port through the passages 146, 140, 138, 144, 128 and 130.

When the pump is started the fluid in the system will be put under pressure. The system pressure will be governed by the regulator valve setting. By means of the adjustment screw 182 the regulator valve may be set to by-pass fluid under pressure from the inlet or pumping port to the return port when the pressure in the accumulator has reached a preselected value. It should be noted that when the pump is pumping fluid to the accumulator with the piston valve in the position shown and with plunger 50 on the valve seat 60 and passage 140 uncovered, the pressure at the inlet 20 and in bore 52 behind the plunger are substantially the same as the accumulator pressure. Therefore, at this time the pressures acting on the ends of push pin 122 are substantially equal. The push pin is balanced under these conditions.

When the pressure of the fluid acting on the right end of the piston valve reaches a predetermined value, depending on the setting of the adjustment 182, the piston valve will be moved to the left against spring 194. This movement causes the piston to cover passage 140 to cut off the right end of plunger 50 and the left end of the push pin from the inlet port. Hence a further building up of inlet pressure on these parts is prevented. However, pressure continues to build up in the accumulator and on the right end of the push pin until a predetermined pressure is reached, at which time the push pin moves against the piston valve to thereby move the same to the left to uncover passage 136 to communicate the left end of the push pin and the right end of the plunger with the return port through passages 136 and 156. This movement of the piston valve causes the release of pressure acting on the right end of the plunger so that the inlet pressure acting on the left end of the plunger will urge the same to the right against the spring 86 to communicate the return port with the inlet port to thereby bypass the fluid to the return port. The last mentioned piston valve movement also causes the simultaneous release of pressure acting on the left end of the push pin so as to create a differential in pressure across the ends of the pin, with the predominating accumulator pressure acting on the right end of the pin tending to move it to the left against the piston valve which is normally urged to the right by the spring 194.

As soon as the accumulator pressure, acting on the right end of the push pin 122, has decreased to a predetermined low value the spring 194 will urge the piston valve 134 and the push pin 122 to the right to cover passage 136 and uncover passage 140. Fluid under pressure is now free to flow from the inlet to the right end of the plunger through the passages 146, 140, 138, 144, 128 and 130. This permits pressure to build up on the right end of the plunger to force the same toward the valve seat 60. The cycle now begins anew.

While I have shown and described a single construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A regulator valve comprising a body having inlet, return and accumulator ports, means establishing a communication between the inlet and accumulator ports, a passageway interconnecting the inlet and return ports, valve means in the passageway normally urged toward closed position, said valve means having one end subjected to pressure at the inlet port at all times tending to move the valve means to open position and the other end subjected to pressure at the inlet port part of the time tending to move the valve means to closed position, a first passage connecting said one end of the valve means to the other end thereof, means for controlling the pressure acting on the other end of the valve means comprising a piston valve constructed and arranged to open and close the first passage, spring means acting on one end of said piston valve to move the same in a direction to open the first passage, said piston valve having its other end subjected to pressure at the inlet port to move the piston valve in a direction to close the first passage, a movable member constructed and arranged to have one end thereof positioned for engagement with said other end of the piston valve to move the same and the other end of said member subjected to pressure at the accumulator port, said member being urged in a direction engaging the piston valve by the pressure at the accumulator port and urged in the opposite direction by pressure at the inlet port, and a second passage connecting said other end of the valve means to the return port and normally closed by said piston valve when the first passage is open, said piston valve being first moved in a direction to close the first passage in response to a preselected pressure at the inlet port and then moved further in the same direction to open the second passage in response to predetermined pressure in the accumulator port acting on said other end of the member to connect the said other end of the valve means to return port, whereby the pressure at the inlet port acting on said one end of the valve means will move the same to open position to connect the inlet port to the return port.

2. A regulator valve comprising a body having inlet, return and accumulator ports, means establishing communication between the inlet and accumulator ports, a passageway interconnecting the inlet and return ports, valve means in the passageway normally urged towards closed position, said valve means having one end subjected to pressure at the inlet port at all times tending to move the valve to open position and the other end subjected to pressure at the inlet port part of the time tending to move the valve to closed position, a first passage connecting said one end of the valve means to the other end thereof, a second passage connecting said other end of the valve means to the return port, means for controlling the pressure acting on the other end of the valve means comprising a piston valve constructed and arranged to open and close the first and second passages, a spring acting on one end of the piston valve urging the same in one direction to open the first passage and close the second passage, the other end of the piston valve being subjected to a preselected pressure at the inlet port urging the piston valve in the opposite direction to close the first passage, to isolate said other end of the valve means from the pressure at the inlet port, and a push pin constructed and arranged to have one of its ends abutting said other end of the piston valve and its other end subjected to pressure at the accumulator port to cause the piston valve to move further in said opposite direction when the accumulator pressure reaches a predetermined value to open the second passage to connect the other end of said valve means to return port so as to create a pressure differential across said valve means to move the same to open position.

3. A regulator valve comprising a body having inlet, return and accumulator ports, means establishing communication between the inlet and accumulator ports, a passageway interconnecting the inlet and return ports, valve means in the passageway normally urged towards closed position, said valve means having one end subjected to pressure at the inlet port at all times tending to move the valve to open position and the other end subjected to pressure at the inlet port part of the time tending to move the valve to closed position, a first passage connecting said one end of the valve means to the other end thereof, a second passage connecting said other end of the valve means to the return port, means for controlling the pressure acting on the other end of the valve means comprising a piston valve constructed and arranged to open and close the first and second passages, adjustable spring means acting on one end of the piston valve urging the same in one direction to open the first passage and close the second passage, the other end of the piston valve being subjected to pressure at the inlet port urging the same in the opposite direction to close the first passage to divorce said other end of the valve means from the pressure at the inlet port, said adjustable spring means being capable of adjustment for varying the pressure from the inlet that is required to move the piston valve to close the first passage, and a push pin constructed and arranged to have one of its ends abutting said other end of the piston valve and its other end subjected to pressure at the accumulator port to cause the piston valve to move further in said opposite direction when the accumulator pressure reaches a predetermined value to open the second passage to connect the other end of said valve means to return port so as to create a pressure differential across said valve means to move the same to open position.

4. A regulator valve comprising a body having inlet, return and accumulator ports, means establishing communication between the inlet and accumulator ports, a passageway interconnecting the inlet and return ports, a valve seat in said passageway, a plunger constructed and arranged to be normally seated on said valve seat, said plunger having one end subjected to pressure at the inlet port at all times tending to unseat said plunger and its other end subjected to pressure at the inlet port part of the time tending to seat the plunger, a first passage connecting said one end of the plunger to said other end thereof, a second passage connecting said other end of the plunger to the return port, means normally opening the first passage and closing the second passage and responsive to pressure at the inlet port above a preselected value to close the first passage to isolate the other end of said plunger from the pressure at the inlet port, and means responsive to pressure at the accumulator port above a predetermined value for moving the first mentioned means to open the second passage to connect the other end of said plunger to return port to create a pressure differential on said plunger to unseat the same.

5. A regulator value comprising a body having inlet, return and accumulator ports, means establishing communication between the inlet and accumulator ports, a passageway interconnecting the inlet and return ports, a valve seat in said passageway, a plunger constructed and arranged to be normally urged toward said valve seat tending to close communication between the inlet and return ports, said plunger having one end subjected to pressure at the inlet port at all times tending to unseat said plunger and its other end subjected to pressure at the inlet port part of the time tending to seat the plunger, a first passage connecting said one end of the plunger to said other end thereof, a second passage connecting said other end of the plunger to the return port, a piston valve constructed and arranged to normally open the first passage and close the second passage, a spring acting on one end of said piston valve urging the same in a direction normally opening the first passage, said piston valve having its other end subjected to a preselected pressure at the inlet port for urging the piston valve in the opposite direction closing the first passage to isolate the other end of said plunger from pressure at the inlet port, and means responsive to pressure at the accumulator port above a predetermined value for moving the piston valve to open the second passage to connect the other end of said plunger to return port to create a pressure differential on said plunger to unseat the same.

6. A regulator valve comprising a body having inlet, return and accumulator ports, means establishing communication between the inlet and accumulator ports, a passageway connecting the inlet and return ports, a valve seat in said passageway, a plunger constructed and arranged to be normally seated on said valve seat, said plunger having one end subjected to pressure at the inlet port at all times tending to unseat said plunger and the other end subjected to pressure at the inlet port part of the time tending to seat the plunger, a first passage connecting said one end of the plunger to the other end thereof, a second passage connecting said other end of the plunger to the return port, means opening the first passage and closing the second passage and responsive to inlet and accumulator port pressures for controlling said first and second passages, said means responsive to pressure in the inlet port above a preselected value for closing the first passage to isolate the other end of said plunger from the inlet port pressure, and responsive to pressure at the accumulator port above a predetermined value for opening the second passage to connect the other end of said plunger to return port.

HAROLD B. SCHULTZ.

REFERENCES CITED

The following references are of record in the file of this patent:

UNITED STATES PATENTS

| Number | Name | Date |
|---|---|---|
| 687,273 | Schoeffel | Nov. 26, 1901 |
| 2,420,890 | MacDuff | May 20, 1947 |